F. Grenier,
Bread Machine,
N° 82,710.      Patented Oct. 6, 1868.

Witnesses:

Inventor:
F. Grenier.

United States Patent Office.

FRANÇOIS GRENIER, OF BEROSERAC, FRANCE, ASSIGNOR TO G. H. MERCER AND A. E. MONOD, OF NEW YORK CITY.

*Letters Patent No. 82,710, dated October 6, 1868.*

IMPROVED DOUGH-MIXER.

*The Schedule referred to in these Letters Patent and making part of the same.*

TO ALL WHOM IT MAY CONCERN:

Be it known that I, FRANÇOIS GRENIER, of Beroserac, in the department of Dordogne, France, have invented a new and improved Dough-Mixing Machine; and I do hereby declare that the following is a full, clear, and exact description thereof, which will enable others skilled in the art to make and use the same, reference being had to the accompanying drawings, forming part of this specification.

Similar letters of reference indicate corresponding parts.

Figure 1:
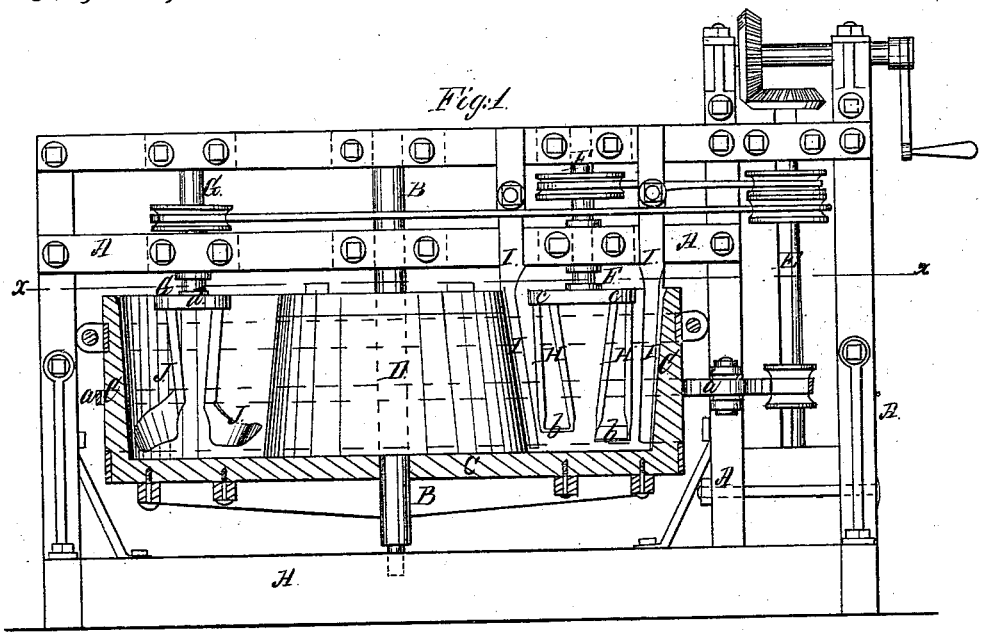
Figure 1 represents a side elevation, partly in section, of my improved dough-mixing machine.

The object of this invention is to construct a machine for mixing dough, in which the motion of the arms, during manual operation, is as nearly as possible imitated.

The invention consists in arranging within an annular wooden vessel, to which rotating motion is imparted, two sets of rapidly revolving stirrers or manipulators, of which one set constitutes the beaters for agitating the dough, while the other is a set of spiral blades, which move the dough vertically, as is also done by hand during manual operation.

A, in the drawing, represents a frame, made of wood or other suitable material. In it is set up an upright spindle, B, on which is mounted a wooden tub, C, of suitable dimensions. In the centre of the tub is arranged a conical core or wall, D, whereby an annular space is formed within the rim of the tub. This annular space is the kneading-trough.

Figure 2:
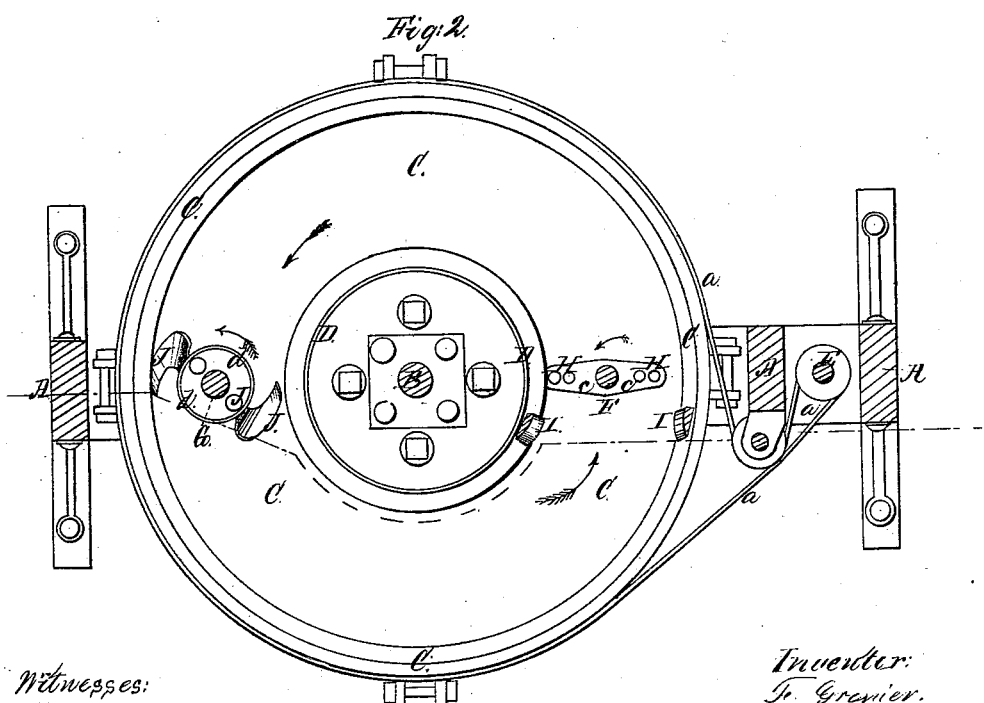
Figure 2 is a horizontal section of the same, taken on the plane of the line $x\text{-}x$, fig. 1.

The shaft B receives rotary motion from a suitable driving-shaft, E, by suitable means. In figs. 1 and 2, this means is represented by a belt, $a$, passing around the tub. Slow rotary motion is thus imparted to the tub.

In the frame A are, above the tub, also the bearings, or rather journals, for two vertical shafts or sets of shafts, F and G, each of which receives rotary motion in suitable direction from the shaft E, or otherwise.

From each shaft F are suspended into the tub C two pairs of bars or rods H H, each pair of which is connected by means of a blade, $b$, at the lower ends.

These pairs of beaters H are attached to a cross-head, $c$, which is formed on the shaft F, and are so far apart as to sweep the distance between the rim of the tub and the core D. As the machine is set in motion, these rods beat the dough, which is brought to their action by the revolving tub C. The blades $b$ scrape the dough from the bottom of the tub, so as to keep the whole contents of the tub thoroughly agitated.

In front of the rods G are suspended, from the frame A, two stationary knives, I I, which are respectively near the rim and core of the annular tub. They scrape the dough from the sides of the tub, as the tub is rotated against their cutting-edges, as indicated in fig. 2. One or more sets of such beaters H are arranged on one machine, each set being suspended from a shaft.

The cross-bar $c$ of the shaft F may be so shaped, by being like a cross or otherwise, as to support, at once, four or more or less pairs of beaters, two being shown in the drawing.

On the shaft or shafts G are also formed cross-heads $d$, from each of which a suitable number of rods J J, are suspended. Each of these rods J has formed on it a screw-blade, as shown, which blade reaches nearly to the bottom of the tub, and which, as it is revolved, serves to raise the dough up, to imitate the upward motion of the same, as imparted to it by hand.

Thus the dough is manipulated and worked, and will be quickly prepared for the oven.

Having thus described my invention, what I claim as new, and desire to secure by Letters Patent, is—

1. The rotating spiral blades J J, and the rotating beaters H H, arranged in pairs, each pair having a bottom-scraper, $b$, in combination with the frame A, substantially as described for the purpose specified.

2. The dough-mixing machine, consisting of the rotating annular trough C, rotating beaters H H, rotating screws J J, and fixed scrapers I I, all made and operating substantially as herein shown and described.

The above specification of my invention signed by me, this        day of       , 1868.

FRANÇOIS GRENIER.

Witnesses—Executed in blank:
  O. OLGIATI, *United States Vice-Consul, Bordeaux.*
  J. GUIRAUD.